United States Patent [19]

Schmidt et al.

[11] Patent Number: 5,157,855

[45] Date of Patent: Oct. 27, 1992

[54] ICE FISHING ASSEMBLY AND HOLE COVER

[76] Inventors: Curtice W. Schmidt, 4882 Erin Cir. SE.; Lyle W. Schmidt, 16924 Willow La. SW., both of, Prior Lake, Minn. 55372

[21] Appl. No.: 690,771

[22] Filed: Apr. 24, 1991

[51] Int. Cl.5 .......................................... A01K 97/12
[52] U.S. Cl. ............................................ 43/17; 43/4
[58] Field of Search ........................................ 43/4, 17

[56] References Cited

U.S. PATENT DOCUMENTS

| | | | |
|---|---|---|---|
| 1,253,746 | 1/1918 | Teeling | 43/17 |
| 3,030,122 | 4/1962 | Madera . | |
| 3,134,188 | 5/1964 | Petersen . | |
| 3,171,404 | 3/1965 | Skog | 43/4 |
| 3,813,891 | 6/1974 | Wooten | 43/4 |
| 3,831,891 | 8/1974 | Jester . | |
| 4,373,287 | 2/1983 | Grahl . | |
| 4,747,226 | 5/1988 | Todd . | |
| 4,780,979 | 11/1988 | Dyck | 43/17 |
| 4,791,909 | 8/1988 | Christian et al. . | |
| 4,794,718 | 1/1989 | Tillman . | |
| 4,953,317 | 9/1990 | Ruchel | 43/17 |

Primary Examiner—Kurt Rowan
Attorney, Agent, or Firm—Sixbey, Friedman, Leedom & Ferguson

[57] ABSTRACT

An ice fishing assembly for retarding the freezing of an ice fishing hole. The ice fishing assembly generally includes a base portion which rests upon the surface of a frozen lake or stream and includes a hole within its center. A fishing device rests upon the upper surface of the base portion and may include a line extension piece extending through the hole and into the water beneath the surface of the ice for securing a fishing line thereto. Specifically, the base portion includes an outer shell portion that substantially covers the upper three quarters of an insulating material. The insulating material is designed with a foil backing material which remains exposed on the under surface of the base portion and directly contacts the ice surface over the hole. The insulating material is preferably composed of a modern insulating material which will not freeze to the surface of the ice. In addition, because the advanced insulating material is not flexible, the base portion may be split into substantially equal halves so that the ice fishing assembly can adapt to smooth, as well as, irregular ice surfaces.

12 Claims, 4 Drawing Sheets

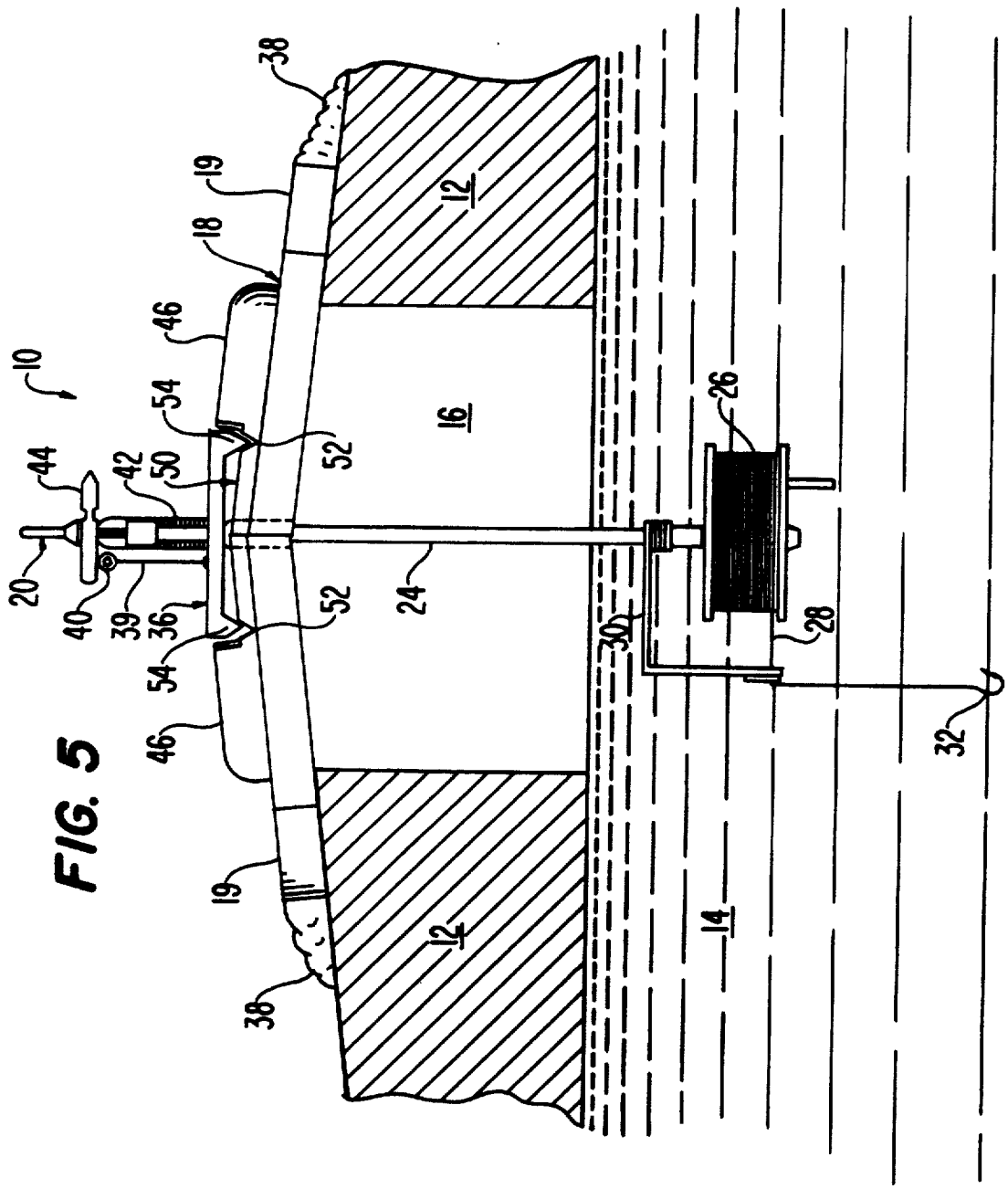

ICE FISHING ASSEMBLY AND HOLE COVER

BACKGROUND OF THE INVENTION

1. Technical Field

The present invention relates in general to a sport fishing device. More particularly, it relates to an ice fishing assembly which is designed to retard the freezing of an ice fishing hole and be effective on a variety of different ice surfaces.

2. Background of the Invention

Ice fishing has long been practiced as a winter sport in which a generally cylindrical hole is bored within the surface of an ice covered lake or stream through which a fishing line can be dropped to the underlying water. A variety of fishing equipment have been developed over the years which include fishing poles, devices for supporting fishing poles and signaling devices for indicating when a fish has struck the submerged bait. One of the problems associated with ice fishing is the extremely cold weather conditions. Brisk winds which may blow over the surface of the lake or stream may cause an exposed ice fishing hole to freeze over before the fishing activity has been completed. In addition, due to the extreme cold, fisherman may not be able to personally attend a given hole for a prolonged period of time to avoid health threatening exposure.

In an attempt to overcome these problems, a variety of ice fishing hole covers or plugs have been developed to prevent or at least retard the freezing over of the fishing hole. In addition, the covers have been equipped with some type of a signaling device to indicate to a fisherman that a fish has struck the fishing line. U.S. Pat. No. 3,134,188 issued to Petersen discloses an insulated fishing pad. The pad includes a flexible insulating material which is completely covered by a waterproof plastic. Further, the pad is designed to include a hole centrally located within the pad for accommodating a tip-up gear and a radial slit that is spread to enable insertion of the tip-up gear. However, this patent requires the use of a flexible insulation material so that the tip-up gear can be mounted within the pad.

U.S. Pat. No. 4,747,226, issued to Todd, discloses an ice fishing accessory that includes a flag assembly secured to a cover for providing a visual indication to the user that a fish has struck the bait. This flag arrangement is included, however, on a cover which fits into an elongated plastic, tubular sleeve that is placed inside of the ice hole to prevent the ice hole from freezing over. Furthermore, this cover cannot accommodate a tip-up gear. The fishing line is merely provided with a loop that is hung on a notched lever arm of the flag.

A number of other devices have been developed which are more complicated than the devices set forth above. Such additional devices are illustrated in the following U.S. Pat. Nos. 3,030,122; 4,747,226; 4,761,909. These devices generally involve bulky sheltering means or plugs which are inserted into the ice fishing hole. Such ice fishing assemblies are generally cumbersome and in some cases do not allow continued fishing of the ice hole while the cover is in place.

Therefore, a need still exists for an ice fishing assembly that is lightweight and includes an insulated base portion which can rest upon irregular, as well as, flat ice surfaces and can easily accommodate a fishing and signaling device. In addition, an ice fishing assembly which includes a means for securing the fishing and signaling device to an insulated base portion to reduce the likelihood of it separating from the base portion would also be highly desirable. The assembly should prevent the hole from freezing over when the device is or is not in use and should be capable of being used over a variety of ice hole sizes and with a variety of different, conventional tip-up gear.

SUMMARY OF THE INVENTION

Therefore, it is an object of the present invention to overcome the shortcomings of the prior art and provide an ice fishing hole assembly which substantially retards the freezing of an ice fishing hole.

Another object of the present invention is to provide a lightweight ice fishing assembly which can also adapt to a variety of irregular ice surfaces.

Still another object of the present invention is to provide an ice fishing assembly that includes a base portion which rests upon the surface of the ice, a fishing device secured to the base portion and a signaling device for indicating when a fish has struck the fishing device wherein the base portion is split into substantially equal halves to allow the assembly to easily receive the tip-up gear while, at the same time, still adequately retarding freezing of the fishing hole even if it is formed in an irregular ice surface.

Yet another object of the present invention is to provide an ice fishing assembly wherein the base portion includes an insulating material which directly contacts the ice surface and acts to trap the heat from the water below the ice surface within the ice fishing hole to retard freezing thereof.

Still another object of the present invention is to provide an ice fishing hole cover, as set forth above, which includes raised projections protruding from the upper surface of the cover that form at least one groove designed to matingly receive a portion of the fishing device to support the fishing device on the base portion.

The present invention is basically directed to an ice fishing assembly and ice hole cover which will retard the freezing of the ice hole when the cover is placed over the hole. The ice fishing assembly generally includes a base portion which rests upon the surface of a frozen lake or stream and includes a hole within its center. A fishing device may rest upon the upper surface of the base portion and may include a line extension means extending through the hole and into the water beneath the surface of the ice for securing a fishing line thereto. Specifically, the base portion includes an outer shell portion that substantially covers the upper three quarters of a rigid insulating material. The insulating material is designed with a foil backing material which remains exposed on the lower surface of the base portion and directly contacts the ice surface around the hole. The insulating material is preferably composed of a modern insulation material which will not freeze to the surface of the ice. In addition, because the advanced insulating material is generally not flexible, the base portion may be split into substantially equal halves so that the ice fishing assembly can adapt to smooth, as well as, irregular ice surfaces.

BRIEF DESCRIPTION OF THE DRAWINGS

FIG. 5 illustrates the present invention on an irregular ice surface.

DETAILED DESCRIPTION OF THE PREFERRED EMBODIMENT

Figure 1:
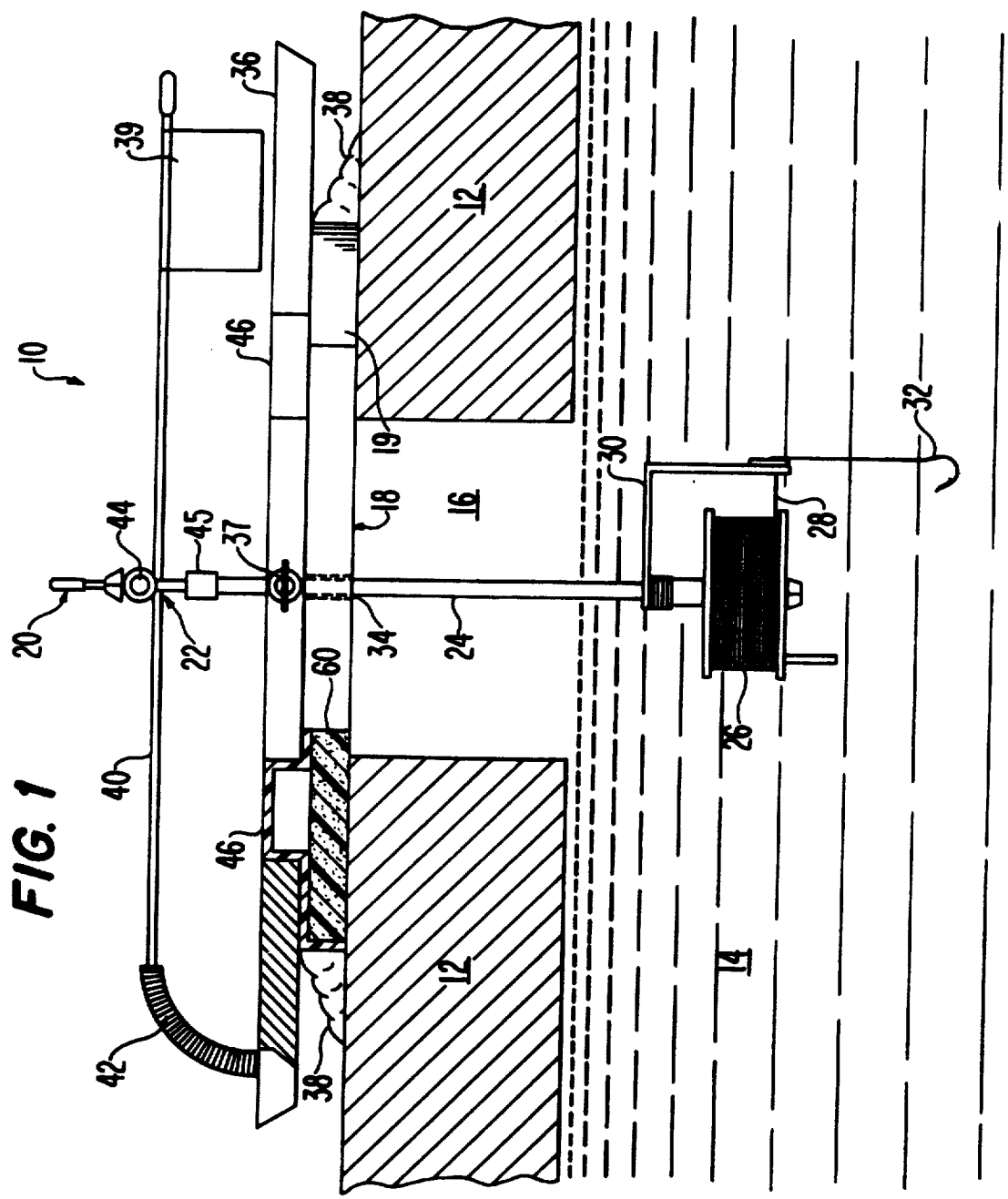
FIG. 1 provides a partially cut-away side view of the ice fishing assembly of the present invention taken along line 1—1 of FIG. 3.
Figure 2:
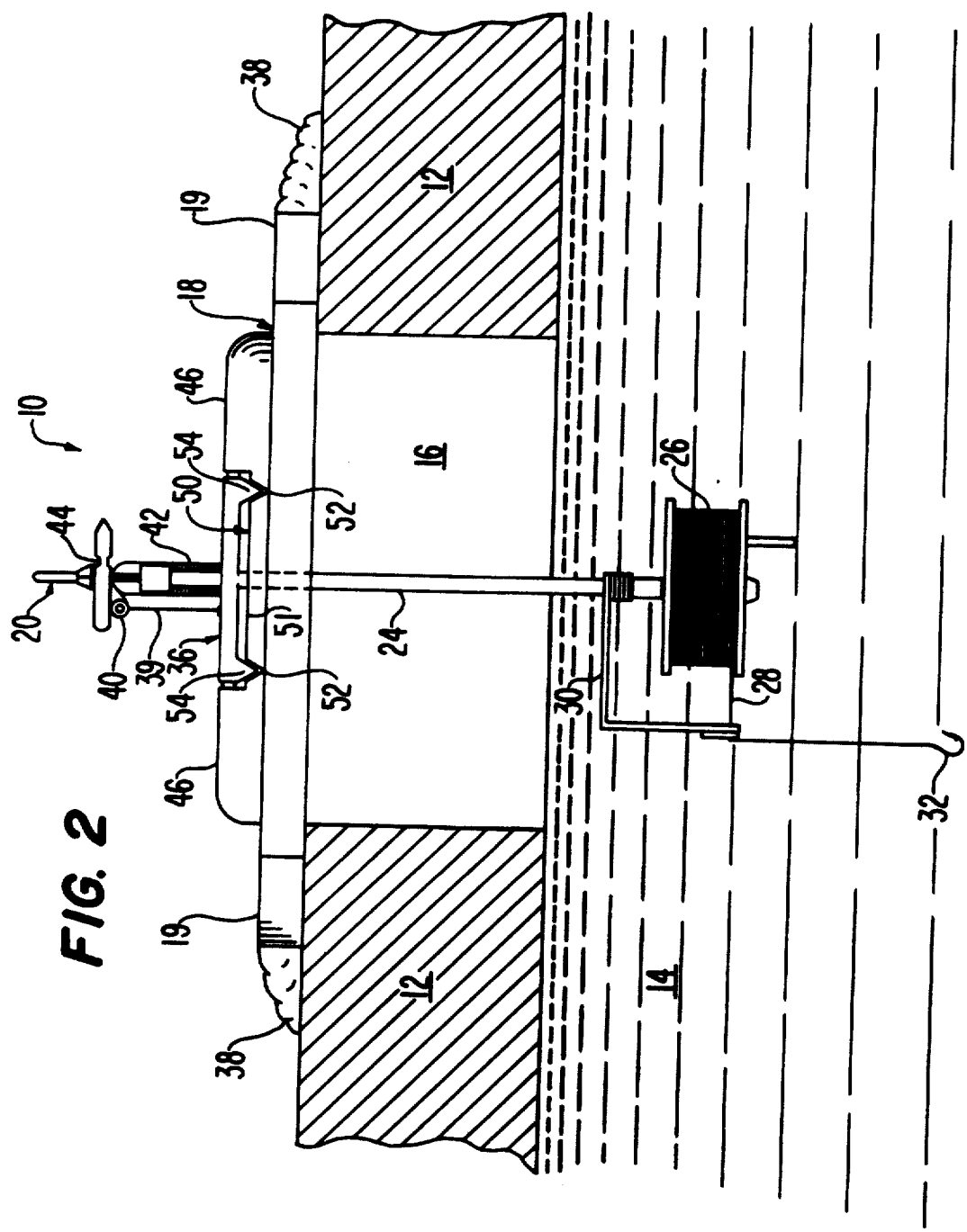
FIG. 2 provides a front view of the ice fishing assembly at a 90° angle from the view illustrated in FIG. 1.

For a clearer understanding of the present invention, reference is initially made to FIGS. 1 and 2, in which an ice fishing assembly 10, in accordance with the preferred embodiment of the invention, is shown resting upon the surface of ice 12 above the water 14 of a lake or stream. The ice fishing assembly is designed to cover an ice hole 16 which has been cut in the surface of ice 12. Due to the extreme weather conditions which are present while ice fishing, namely cold temperatures, possibly accompanied by strong winds, ice fishing assembly 10 is designed to retard the freezing of ice hole 16 after assembly 10 has been place thereover. A base portion 18 is provided to rest directly upon ice 12 and includes an insulating material 60 which will shield ice hole 16 from the elements. A fishing device 20 rests upon and extends through the base portion 18 and is of sufficient weight to prevent ice fishing assembly 10 from blowing off of ice hole 16 during commonly strong winter winds. The corners of the base portion 18 may be beveled to form angular wall portions 19 (See FIG. 2).

Fishing assembly 10 includes a signaling device 22 which alerts a fisherman using assembly 10 that a fish has struck the line of the fishing device 20. The signaling device may be a conventional tip-up gear. In addition, the entire upper surface of base portion 18 and signaling device 22 is, preferably, a bright fluorescent orange color so that the ice fishing assembly will be easily seen upon the surface of the ice, a characteristic that is especially important on lakes where ice boating or snowmobiling occurs. Each of these components will be explained in greater detail below.

Beginning first with the fishing and signaling devices, in general, any conventional fishing and signaling device may be used. Preferably, fishing device 20 includes a central shaft 24 that extends from a position above base portion 18 to a position below the surface of water 14. Attached to the lower portion of shaft 24 is a fishing reel mechanism 26 which includes fishing line 28. Preferably, reel mechanism 26 includes an extension piece 30 which helps to prevent fishing line 28 from getting tangled during operation of reel mechanism 26. Generally, a hook 32 to hold the bait or lure (not shown) is provided at the end of line 28. Shaft 24 extends upward through a hole 34 in base portion 18 and is attached to a weighted frame assembly 36 by a bolt and wing nut combination 37. Frame assembly 36 is preferably designed to extend past the outer boundary of base portion 18 to make it easier to place on and remove from the base. Because of its weight and size, frame assembly 36 can maintain ice fishing assembly 10 over ice hole 16 without requiring additional anchoring means which are common among prior art devices. After ice hole 16 has been formed, loose ice and snow can be collected and formed into small berms 38 to further secure fishing assembly 10 over ice hole 16. The simplicity of the ice fishing assembly of the present invention provides a fishing assembly that is easily transportable by a fisherman to any desired location.

As set forth above, ice fishing assembly 10 also includes a signaling device 22. Signaling devices have been used for many years to provide a fisherman with some indication of when a fish has struck the submerged bait. Preferably, signaling device 22 includes a flag 39 attached to a pole 40. Pole 40 is in turn connected to weighted frame assembly 36 by a spring attachment 42. A sufficiently long pole 40 is used to enable flag 33 to be detectable from a distance, and via spring attachment 42 pole 40 can be bent, until it lays substantially parallel to frame assembly 36, in a retracted position as illustrated in FIG. 1.

A release mechanism 44 is provided to release pole 40 from its retracted position, so that spring 42 will return it to an upright position perpendicular to frame assembly 36, in response to movement of shaft 24. As more clearly illustrated in FIG. 2, release mechanism 44 can be a simple "T"-bar assembly which, when turned, releases pole 40 from underneath one of the arms of the "T". When a fish is caught, unwinding of the line 28 rotates the reel 26 which, in turn, rotates a threaded shaft that causes the "T" to be swung so that the arm holding pole 40 is twisted off of pole 40 to release the pole so that it can spring up. The release mechanism 44 can be an integral portion of shaft 24 or threadingly attached to the shaft by a nut 45, as shown.

Figure 3:
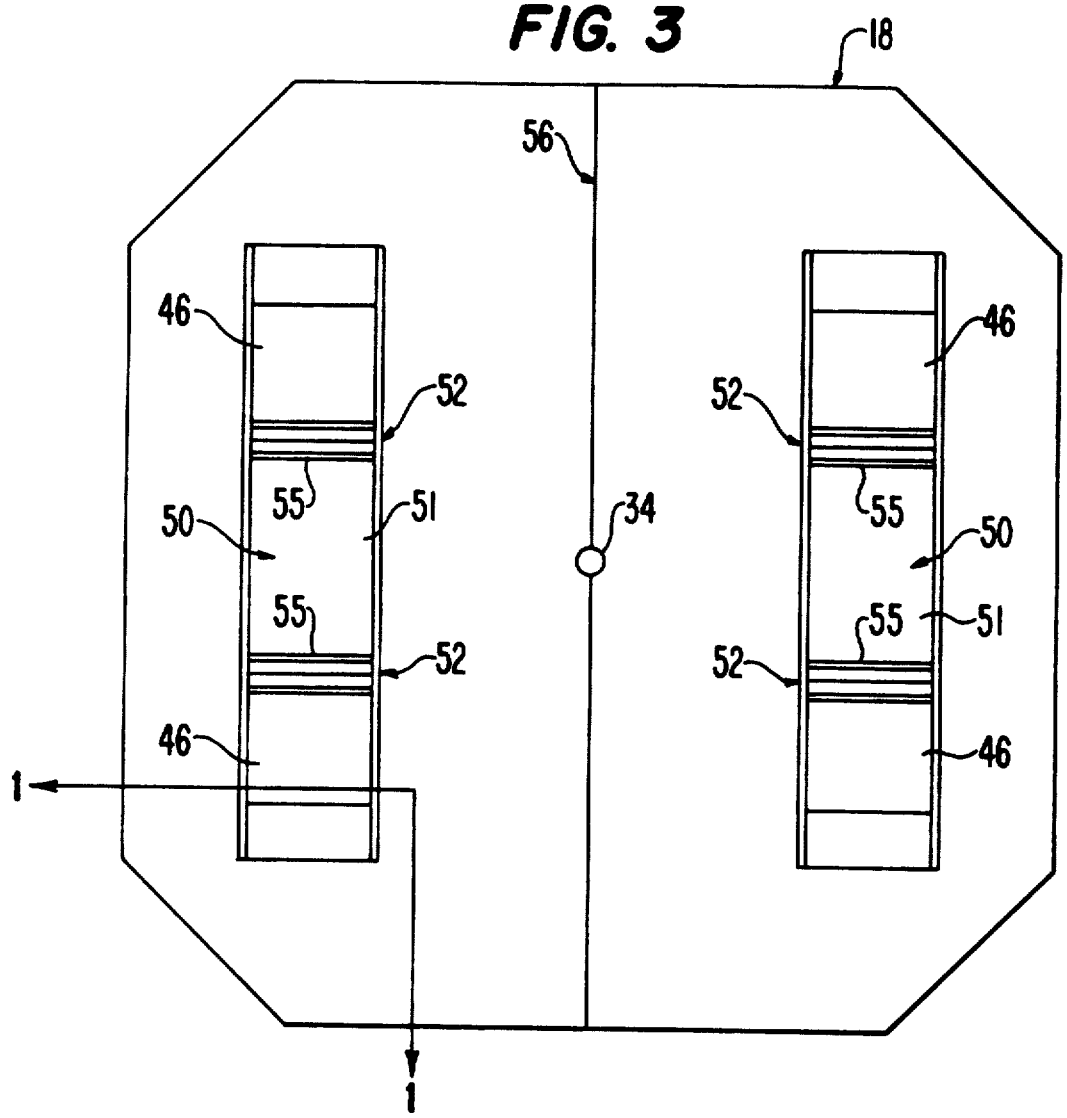
FIG. 3 provides a top view of the base portion of the present invention.

Referring now, primarily, to FIGS. 2 and 3, additional features of base portion 18 become readily apparent. Base portion 18 includes a pair of raised protrusions 46, one being located on each half of the base portion. Each of the protrusions includes a recessed area 50 preferably located in the center of the protrusions. Each end of a bottom wall 51 of recessed area 50 has a V-shaped groove 52 formed in it. Grooves 52 are designed to matingly receive V-shaped portions 54 extending from the bottom of frame assembly 36.

A base portion 18 in accordance with the present invention provides a fisherman with a lightweight apparatus that provides a means for substantially preventing the fishing device from sliding off of the base portion during strong winter winds and for allowing a fisherman to leave the ice hole 16 unattended. Base portion 18 is specifically designed to include grooves 52 which will easily receive corresponding portions of the frame assembly 36. No attachment means are required. The fishing device is merely placed upon base portion 18 so that its V-shaped portions fit snugly within the grooves. This simple design feature further secures fishing device 20 to base portion 18 without requiring the complicated attachment means which could be difficult to handle while wearing gloves out on a frozen lake or stream. These features will be illustrated in even greater detail below.

Figure 4:
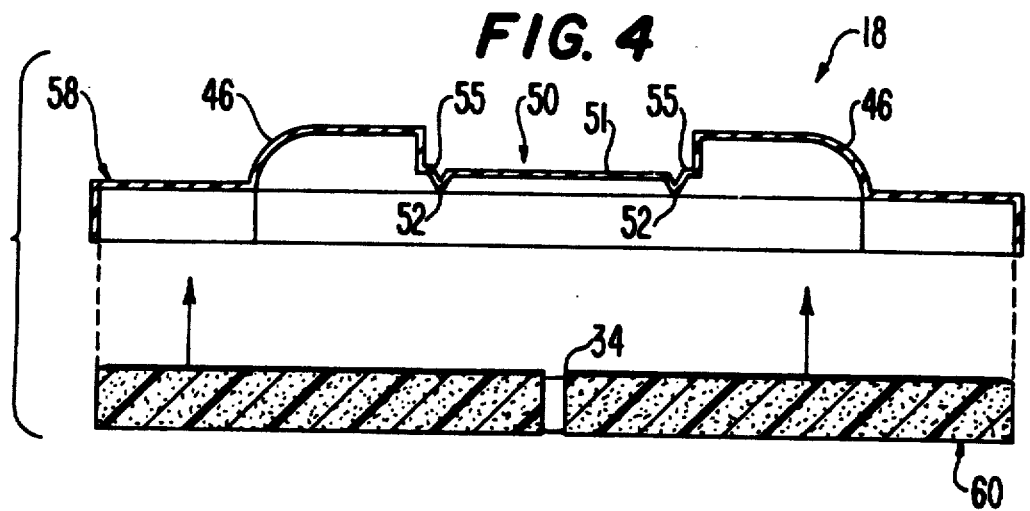
FIG. 4 provides an exploded cross-sectional view of the above illustrated base portion.

FIG. 3 illustrates base portion 18 as it appears from above. In this view, it can be clearly seen how raised protrusions 46 are located upon the upper surface of base portion 18. Preferably, base portion 18 is split at cut 56 into substantially equal halves. Because the insulating material, shown in greater detail below in FIG. 4, is rigid, the fact that portion 18 is split allows it to be easily placed under the weighted frame assembly 36 which holds together the halves even when the two halves are not parallely disposed or where one is slightly higher than the other. In addition, the base portion can also accommodate ice holes that are located on irregular ice surfaces because the base portion 18 is inherently adjustable at cut 56 to allow a degree of play between each half. This allows each half of base portion 18 to fit against shaft 24 of fishing device 20 on irregular ice surfaces while still retarding the freezing of ice hole 16. See FIG. 5.

As stated generally above, ice fishing assembly 10 is designed to cover ice hole 16 and retard ice hole 16 from freezing back over. This is accomplished by forming the interior of base portion 18 from an insulation material. FIG. 4 provides a cross-sectional, exploded view of base portion 18 illustrating its internal design. Specifically, base portion 18 includes a shell 58 and insulation core 60. Shell 58 is preferably made from a moldable plastic material so that raised protrusions 46 can be easily molded therein. Insulation core 60 is designed to fit within shell 58 and provide the lower surface of base portion 18 which actually contacts ice 12. Insulation core 60 can be secured within shell 58 by any conventional adhesive. The base formed of shell 59 and core 60 can, initially, be formed as separate base halves or can be formed as a one-piece base that is, subsequently cut into halves.

In the preferred embodiment, insulation core 60 is a cut piece of OWENS-CORNING ENERGY SHIELD SHEATHING. This insulation material is composed of closed cell polyisocyanurate foam. This advanced form of insulation is a highly efficient thermal insulation board. However, such insulation board is not flexible. Therefore, cut 56 is used to make the base portion adaptable to irregular ice surfaces. One of the reasons that this type of insulation board is beneficial for this invention is the fact that each side of the closed cell foam is bonded to aluminum foil which provides excellent resistance to water. Therefore, the insulation does not require any special coating before its use in the harsh winter environment present while ice fishing. This type of insulating material is also capable of sufficiently trapping heat beneath its lower surface to prevent it from freezing to the surface of the ice.

FIG. 4 also clearly illustrates grooves 52. Grooves 52 preferably include an abutment piece 55 which extends from the inner edge of recessed area 50 to provide a snug fit between grooves 52 and V-shaped portions 54 of weighted frame assembly 36. This abutment piece further secures the entire fishing assembly to base portion 18 so that the base portion does not slide out from under weighted frame assembly 36 during strong winds while the fishing assembly is left unattended. FIG. 5 illustrates how frame assembly 36 rests upon base portion 18 on an irregular ice surface.

The ice fishing assembly of the present invention is easily used. After a hole in the ice has been cut, each half of base portion 18 is set in position around the edges of ice hole 16. Fishing device 20 can then be lowered into the ice hole. Each half of the base portion is then slid into place so that the wall portions of base 18 defining hole 34 substantially contact shaft 24 of fishing device 20. V-shaped portions 54 should be placed within grooves 52. This will further ensure that each half of base portion 18 is in sufficient contact at cut 56 to avoid an excessive leakage of heat which could prematurely cause ice hole 16 to freeze over. Any means of resting weighted frame assembly 36 upon base portion 18 is acceptable.

The procedure given above is merely provided as an example. An ice fishing assembly made in accordance with the present invention allows the use of a simple base portion utilizing a substantially rigid, technologically advanced insulating material that will retard the freezing of an ice hole used for ice fishing and that can rest upon smooth, as well as, rough ice surfaces without freezing to the ice surface.

We claim:

1. An ice fishing assembly for retarding the freezing of a fishing hole within a surface of ice while simultaneously allowing the fishing hole to be fished, wherein said assembly comprises a base portion for resting upon the surface of the ice, a fishing device which is supported upon said base portion and a signaling means which is integrally secured to said fishing assembly for indicating when a fish has contacted said fishing device, wherein said base portion includes an outer shell portion and inner core comprising insulating material, and wherein said base portion is split into substantially equal halves so that said base portion can rest upon irregular, as well as, flat ice surfaces while maintaining the fishing device essentially vertically oriented, and wherein said base portion further includes raised projections which protrude from said base portion and include at least one groove which is designed to matingly receive a portion of said fishing device.

2. An ice fishing assembly of claim 1, wherein said base portion includes a pair of raised projections each of which defines a recessed area and includes a pair of grooves which are designed to matingly receive a corresponding portion of said fishing device.

3. An ice fishing assembly of claim 1,
wherein said insulating material comprises a closed cell, foamed polymer which includes a foil facing material, and wherein said facing material is placed in direct contact with the surface of the ice.

4. An ice fishing assembly of claim 3, wherein said insulating material comprises closed cell polyisocyanurate foam.

5. An ice fishing assembly of claim 1, wherein said halves of the base portion, together, define a hole extending through the base portion, and wherein said fishing device includes a line extension means extending through said hole and into water beneath the surface of the ice for securing fishing line and a fishing hook thereto.

6. An ice fishing assembly of claim 5, wherein said signaling means includes a spring actuated flag assembly for providing a visual indication of when a fish has struck the fishing device.

7. An ice fishing assembly for retarding the freezing of a fishing hole within a surface of ice while simultaneously allowing the fishing hole to be fished wherein said assembly comprises a base portion which rests upon the surface of the ice and includes a hole within its center, a fishing device secured to said base portion and a signaling means integrally secured to said base portion and said fishing device for indicating when a fish has been caught by said fishing device, wherein said base portion further includes raised projections which protrude from an upper surface of said base portion and include at least one groove which is designed to matingly receive a portion of said fishing device.

8. An ice fishing hole cover for retarding the freezing of a fishing hole within a surface of ice while simultaneously allowing the fishing hole to be fished wherein said cover rests upon the surface of the ice, said cover comprising a hole within its center to accommodate a fishing device and raised projections which protrude from said cover and include at least one groove which is designed to matingly receive a corresponding portion of said fishing device.

9. An ice fishing hole cover of claim 8, wherein said cover is split into substantially equal halves so that said cover can rest upon flat, as well as, irregular ice surfaces.

10. An ice fishing hole cover of claim 8, wherein said cover includes an outer shell portion and inner core comprising insulating material.

11. An ice fishing hole cover of claim 10, wherein said insulating material comprises a closed cell, foamed polymer which includes a foiled facing material wherein said facing material is placed in direct contact with the surface of the ice.

12. An ice fishing hole cover of claim 11, wherein said insulating material comprises closed cell polyisocyanurate foam.

* * * * *